United States Patent [19]

Campillo et al.

[11] 4,349,907
[45] Sep. 14, 1982

[54] BROADLY TUNABLE PICOSECOND IR SOURCE

[75] Inventors: Anthony J. Campillo, Nesconset, N.Y.; Ronald C. Hyer; Stanley J. Shapiro, both of Los Alamos, N. Mex.

[73] Assignee: The United Stated of America as represented by the Department of Energy, Washington, D.C.

[21] Appl. No.: 143,059

[22] Filed: Apr. 23, 1980

[51] Int. Cl.$^3$ ............................................. H01S 3/00
[52] U.S. Cl. ....................................... 372/92; 372/94; 372/21; 372/102; 307/425
[58] Field of Search .................. 331/94.5 C, 94.5 F; 307/425; 331/94.5 M

[56] References Cited

U.S. PATENT DOCUMENTS 3,735,280  5/1977  Johnston, Jr. .
3,774,121  11/1973 Ashkin et al. .................. 331/94.5 M
4,200,808  4/1980  Herbst .................................. 307/425

OTHER PUBLICATIONS

"Intense Tunable Picosecond Pulses in the Infrared" Lauberbeau et al. *App. Phys. Lett.*, vol. 25, No. 1, Jul. 74.
"Broadly Tunable Repetitive, Picosecond Parametric Oscillator" Tanaka et al., *Opt. Comm.* vol. 25, No. 2, May 1978.
"Tunable Infrared Ultrashort Pulses from a Mode-Locked Parametric Oscillator", Weisman, *Opt. Comm.* vol. 19, No. 1, Oct. 1976.

*Primary Examiner*—William L. Sikes
*Assistant Examiner*—Leon Scott, Jr.
*Attorney, Agent, or Firm*—Paul D. Gaetjens; Richard G. Besha; James E. Denny

[57] ABSTRACT

A picosecond traveling-wave parametric device capable of controlled spectral bandwidth and wavelength in the infrared is reported. Intense 1.064 $\mu$m picosecond pulses (1) pass through a 4.5 cm long LiNbO$_3$ optical parametric oscillator crystal (2) set at its degeneracy angle. A broad band emerges, and a simple grating (3) and mirror (4) arrangement is used to inject a selected narrow-band into a 2 cm long LiNbO$_3$ optical parametric amplifier crystal (5) along a second pump line. Typical input energies at 1.064 $\mu$m along both pump lines are 6–8 mJ for the oscillator and 10 mJ for the amplifier. This yields 1 mJ of tunable output in the range 1.98 to 2.38 $\mu$m which when down-converted in a 1 cm long CdSe crystal mixer (6) gives 2 $\mu$J of tunable radiation over the 14.8 to 18.5 $\mu$m region. The bandwidth and wavelength of both the 2 and 16 $\mu$m radiation output are controlled solely by the diffraction grating.

18 Claims, 3 Drawing Figures

BROADLY TUNABLE PICOSECOND IR SOURCE

The United States Government has rights in this invention pursuant to Contact No. W-7405-ENG-36 between the U.S. Department of Energy and the Los Alamos Scientific Laboratory.

BACKGROUND OF THE INVENTION

The generation of infrared picosecond pulses ($\sim 10^{-12}$ s pulse duration) has received increasing attention over the last several years principally for optical communications, for the investigation of multiple-photon absorption and vibrational energy transfer processes in molecules, and for laser fusion. In particular, the infrared region between 10 and 20 $\mu$m is of great importance since most molecules have characteristic absorptions there. To our knowledge, the only existing picosecond source in this range is the 10 $\mu$m $CO_2$ laser. However, this laser provides coverage of only a small portion of the desired wavelengths. The present invention, in contrast, provides broadly and continuously tunable high power infrared radiation with picosecond temporal resolution between 10 and 20 $\mu$m. The bandwidth and operating wavelength are completely controlled by the use of a diffraction grating and the device is simple, stable and reliable. The device utilizes two lithium niobate crystals positioned in series but separated by the grating and optically pumped by a 1.06 $\mu$m mode-locked Nd:YAG laser to generate and amplify infrared radiation between 1.9 and 2.4 $\mu$m. The generated radiation is subsequently converted into 10–20 $\mu$m picosecond radiation by difference-frequency mixing in a cadmium selenide crystal.

Picosecond pulses have been generated in the infrared region (1.3–3.6 $\mu$m) in the past using 1.06 $\mu$m optically pumped lithium niobate optical parametric devices in the travelingwave mode which, with modification, is what is done by the instant invention. (See, e.g., Laubereau et al., App. Phys. Letters 25, 87 (1974)) However, several disadvantages associated with these previous devices are successfully overcome as a result of said modifications. In the conventional generation techniques, in intense, short duration light pulse at fixed frequency $\nu_p$ is sent through one (or more) nonlinear crystals ($LiNbO_3$, for example) which act as parametric, threephoton amplifiers. Starting from spontaneous noise at frequency $\nu_s$, a significant magnitude signal of frequency $\nu_s$, is produced in the first crystal amplifier. The signal may be further amplified in subsequent crystals. The energy for the production of $\nu_s$ comes from the $\nu_p$ electromagnetic field. A second frequency called the idler, $\nu_i$, is also generated in the crystal such that $\nu_s + \nu_i = \nu_p$. This condition is simply a consequence of energy conservation. The specific $\nu_i, \nu_s$ set which will be amplified is determined by the "phase matching" conditions, $k_p = k_s + k_i$. $k_p$, $k_s$ and $k_i$ are the wave vectors, defined as $k_p = 2\pi n_p \nu_p$, $k_s = 2\pi n_s \nu_s$ and $k_i = 2\pi n_i \nu_i$, of the pump, signal and idler, respectively. $n_p$, $n_s$, and $n_i$ are the corresponding indices of refraction. The high intensity requirement of $\nu_p$ is necessary to produce a high amplification within a path length of a few centimeters. Single pulses have the advantage of allowing the application of such high pump intensities without crystal damage.

The first disadvantage that the instant invention overcomes is that of unusably broad spectral bandwidths. The bandwidth in previous devices was primarily determined by the phase-matching conditions in the non-linear crystal. Spectrally narrow pulses are normally generated only when the device is tuned far from the degenerate point ($\nu_s \sim \nu_i$), thereby severely restricting the useful operating range. With our invention, the bandwidth is determined by the character of the diffraction grating and its distance from the second lithium niobate crystal. An advantage of being able to operate near the degenerate point is that in the subsequent mixing of the signal and idler frequencies in the cadmium selenide crystal we can generate radiation continuous from 10 to 20 $\mu$m as the difference, $|\nu_s - \nu_i|$. Previous to this invention there was no such picosecond infrared source available.

A second disadvantage of the usual parametric traveling-wave scheme is that non-collinear components can experience significant amplification resulting in a highly divergent beam. Although this can be improved considerably (<3 mrad beam divergence) by positioning a second crystal where the pump beam overlaps the signal beam and amplifies only collinear components, the beam still may be spectrally broad. Furthermore, when two or more crystals are used, the frequency tuning process is tedious and difficult because the crystals must be simultaneously and precisely rotated to maintain the aforementioned phase-matching condition, and the entire apparatus becomes unstable to mechanical and thermal fluctuations.

Our invention (See Campillo et al., Opt. letters 4, 325 (1979), and Opt. Letters 4, 357 (1979)) successfully overcomes these difficulties by first generating a broadband (1.9–2.4 $\mu$m) picosecond continuum in a $LiNbO_3$ crystal and then isolating and injecting a specific spectral-spatial component into a second broadband parametric amplifier by means of a diffraction grating. The grating additionally provides the required narrow spectral bandwidth. Thus the instant invention provides a high power, broadly and continuously tunable picosecond infrared source which is also simple, stable and reliable.

SUMMARY OF THE INVENTION

An object of the present invention is to produce picosecond duration, small beam divergence, narrow spectral bandwidth, continuously tunable infrared radiation.

Another object of the invention is to provide a picosecond infrared source which is simple to operate and stable to mechanical and thermal fluctuations.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the apparatus of the instant invention may comprise an intense, picosecond duration infrared pump laser which for purposes of efficiency is designed to operate at a chosen fixed frequency, the high energy pulse output thereof being divided along two paths by means of a partially reflecting mirror, for example, a three-photon traveling wave parametric oscillator located in one of the optical pathways and oriented relative to the pump laser beam so as to operate in its degenerate mode which means that the signal and idler frequencies generated in response to the high energy infrared laser pulses and resulting from amplification of spontaneous noise at the required frequencies are extremely broadbanded and approximately equal in frequency, a spectral and spatial component selection device such as a diffraction grating to select a narrow-band of frequency output from the continuum emitted by the optical parametric oscillator, a three-photon traveling wave parametric amplifier which is located in the second of the two optical pathways and oriented such that it too is operating near its degeneracy point and which amplifier under the influence of the high energy laser pulses amplifies and emits the selected spectral component emitted by the oscillator and directed to it by means of the aforementioned spectral-spatial selection device and regenerates and emits a corresponding idler or signal frequency such that the difference in frequency between the amplified selected spectral-spatial component and the regenerated idler or signal frequency falls in the 10–20 μm region of the infrared, and a mixing means such as crystal for receiving the emitted amplified selected spectral-spatial component and the regenerated signal or idler frequency and mixing them to produce and emit a difference frequency of longer wavelength.

In a further aspect of the present invention, in accordance with its objects and purposes, the method hereof may also comprise the steps of repetitively producing high energy picosecond duration infrared light pulses of a first frequency, receiving and dividing this pump laser output into two parts, directing each part along a different optical pathway, operating a three-photon traveling wave oscillator which is situated in one of the optical pathways and is responsive to the divided high energy light pulses at its degeneracy point, thereby generating and emitting picosecond duration, broad-banded, coherent signal and idler frequencies from amplifying spontaneous noise at the required frequencies and using the divided high energy light pulses as a source of energy, receiving and selecting a particular narrow-banded spectral component of said emitted coherent signal and idler frequencies, receiving the particular spectral component and selecting a particular spatial component yielding a selected spectral-spatial component of coherent radiation of the emitted coherent signal or idler frequencies, operating a three-photon traveling wave amplifier which is located in the second of the optical pathways and responsive to both the divided high energy light pulses and the selected spectral-spatial component of coherent radiation of the emitted coherent signal or idler frequencies, amplifying and emitting the latter and regenerating therefrom and emitting corresponding idler or signal frequencies, respectively, by using the divided high energy light pulses as a source of energy, and receiving and mixing the amplified signal or idler frequencies with the regenerated idler or signal frequency, respectively, thereby producing and emitting coherent picosecond duration continuously tunable difference frequencies at a second frequency which is of longer wavelength.

In a further aspect of the present invention, in accordance with its objects and purposes, the apparatus hereof may also comprise a crystal for difference frequency mixing of the signal and idler frequencies for the generation of broadly tunable picosecond infrared radiation between 10 and 20 μm.

Advantages of the present invention over prior art described in the Background of the Invention, supra, are briefly narrow spectral bandwidth without the sacrifice of broad, continuous tunability, freedom from iterative, simultaneous "tuning" of the nonlinear crystals to maintain the critical phase-matching condition while frequency tuning the apparatus, and improvement in light output stability to mechanical and thermal fluctuations of the invention.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
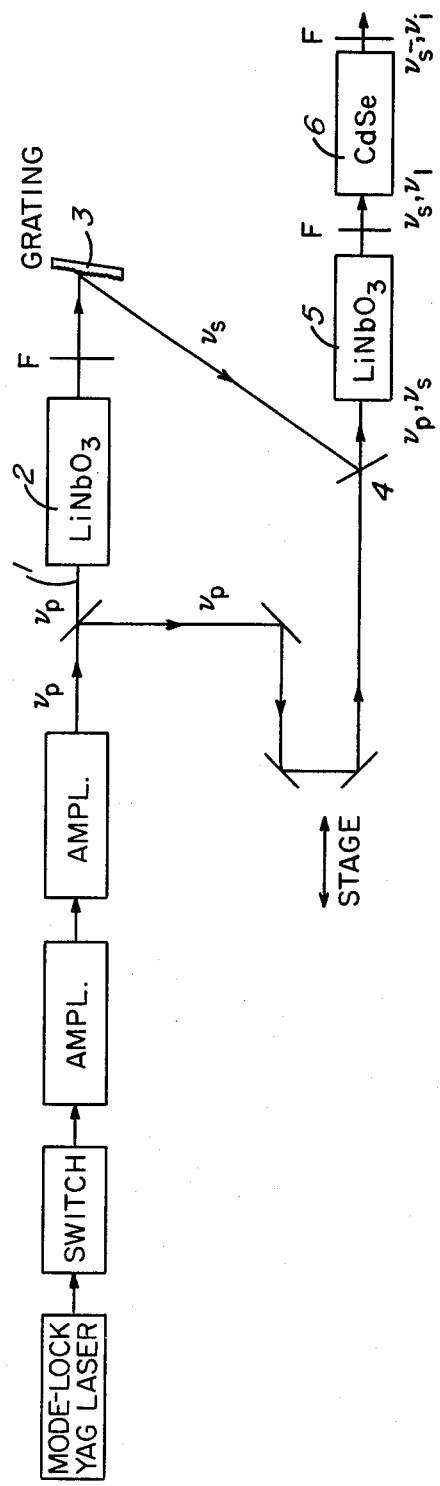
FIG. 1 is a schematic of the configuration of the apparatus used to generate broadly tunable picosecond infrared pulses.
Figure 2:
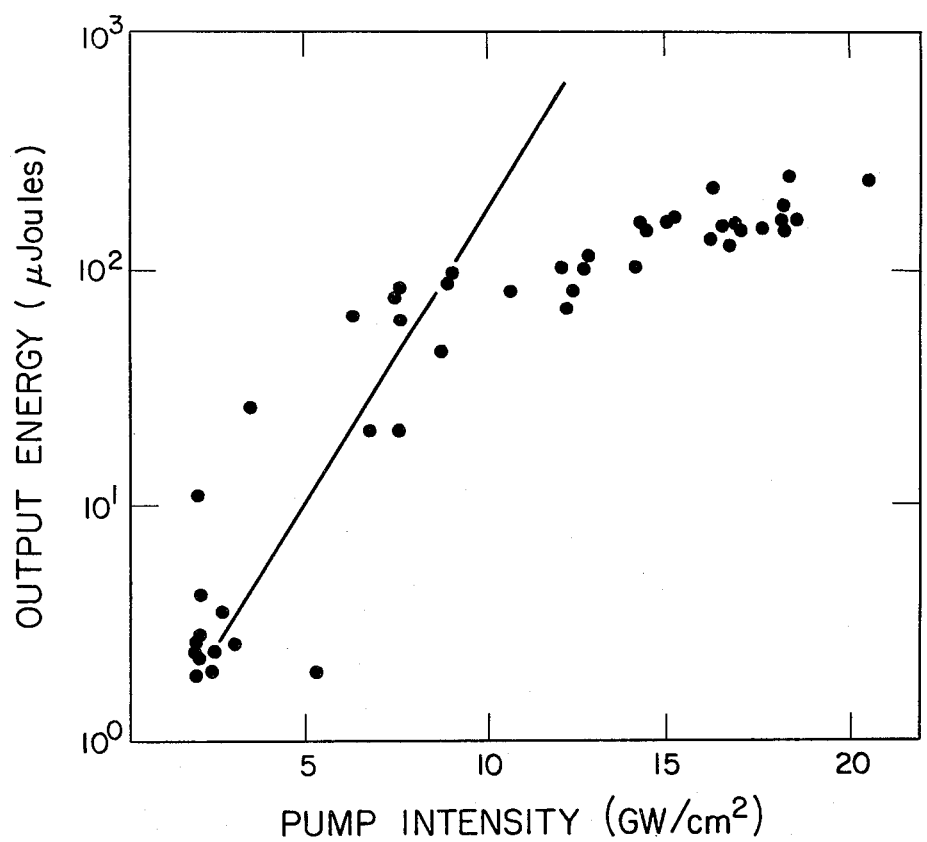
FIG. 2 shows the output energy of a typical parametric amplifier as a function of pump laser intensity.

Reference will now be made in detail to the present preferred embodiment of the invention, an example of which is illustrated in the accompanying drawings. The configuration of the device is schematically described in FIG. 1. A repetitively flashlamp-pumped (10 Hz) mode-locked Nd:YAG laser emits a train of 40 ps-duration pulses on each flashlamp cycle. A single pulse is selected from the train by a crossed polarizer Pockels cell arrangement. This pulse is then amplified by two 0.635 cm-diameter Nd:YAG amplifiers and split into two beams. One beam is directed along a 4.5 cm long, $\theta=45°$ cut lithium niobate crystal which acts as a traveling-wave parametric oscillator (since the exact cut of our crystal was not known to better than 0.1° the crystal angle is initially adjusted by rotation so that the amplification gain is maximized near 5000 cm$^{-1}$ ($2\times 1.064$ μm)). By this it is meant that spontaneous noise of the "desired frequency" is amplified and emitted at various angles. The "desired frequency" is determined by simultaneously satisfying the energy conservation condition, $\nu_p=\nu_s+\nu_i$ and the phase matching condition as previously discussed. Here, $\nu_s$ and $\nu_i$ represent the signal and idler frequencies, respectively, and both frequencies which occur as random noise at very low levels within the LiNbO$_3$ crystal are amplified and emitted. $k_p$ is sensitive to the propagation direction for LiNbO$_3$ and consequently the particular angle of the oscillator/amplifier crystal relative to the pump beam determines the numerical relationship between $\nu_s$ and $\nu_i$. At certain angles (in the case of LiNbO$_3$, 44.672°), $\nu_s=\nu_i$ and we have what is known as a degenerate point. Near this point, the gain bandwidth is extremely broad. As a matter of fact, the observed ~1000 cm$^{-1}$ bandwidth was not predicted by the normally applied theory. However, we were able to quantitatively explain this unexpected discovery in a recent paper. (Campillo et al., Opt. Letters 4 357 (1979)). Of the three factors which contribute significantly to the bandwidth (operation near degeneracy, non-collinear phase-matching (where non-collinear light beams experience significant gains), and parametric gain broadening), parametric gain broadening was found to contribute ~800 cm$^{-1}$ to the bandwidth as a result of the high pump laser intensities incident on the crystal, and the large amplitude signals ($v_s$ and $v_i$) generated therein. The large bandwidth is critical to the continuously tunable and stability advances to the art provided by this invention. With a pump energy of 6–8 mJ in a beam waist of 2 mm, a combined total of 200 μJ of signal and idler was observed with collection over all angles. At high pump intensities (~6 GW/cm$^2$) there was a strong saturation in output energy which is attributable to energy flowing back into the pump electromagnetic field from the signal and idler fields. See FIG. 2. The wavelength range of the collinear and nearly collinear (<4 mrad) components of the emission from the traveling-wave oscillator was found to extend with nearly uniform intensity from 1.92 to 2.38 μm by using a 1 m Spex monochrometer and a PbS detector; outside of this range there was a sharp decrease in emitted energy.

The emission from the first crystal is diffracted by a grating (600 lines/mm), and the desired spectral and spatial component injected into a second nearly degenerate ($v_s \sim v_i$) 2 cm long LiNbO$_3$ amplifier located in the second pump beam line. Overlap of the parallel components of $v_p$ and $v_s$ in the parametric amplifier permits preferential amplification. That is, only those components at frequency $v_s$ which both overlap those of $v_p$ and are collinear with them in the crystal are amplified. Noncollinear components (at somewhat different $v_s$), originating at the first crystal, striking and grating and diffracting thereon to overlap the pump in the second amplifier experience relatively little gain. Incomplete spatial overlap with the pump, phase mismatch and temporal non-coincidence with the pump beam all contribute to gain reduction for these components. To further limit the subsequently amplified spatial-spectral components an aperture can be placed between the grating and the second crystal. Recall that the wavelength of the signal emission is determined by the grating angle, while that of the pump is fixed. As the injected component is amplified, the corresponding idler is regenerated. Signal and idler were each typically about 0.5 mJ in energy and 10–15 ps in duration when a pump energy of 10 mJ was used. Use of a second crystal also reduces the required input energy and yields the entire 200 μJ in the collimated beam.

Figure 3:
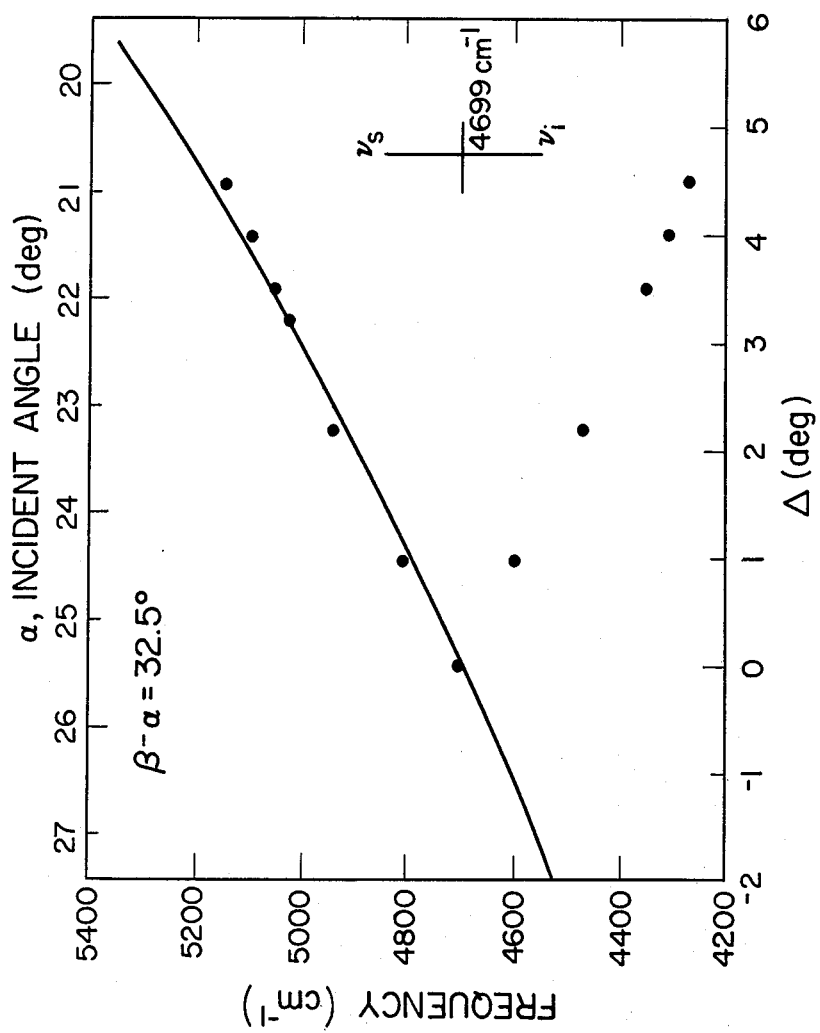
FIG. 3 shows the observed frequency of the lithium niobate optical parametric amplifier as a function of grating angle. The solid line is that predicted by the grating formula. $\alpha$ and $\beta$ are angles of the incident and diffracted beams with respect to the grating normal.

The wavelength and spectral purity are totally controlled by the grating. FIG. 3 shows the observed output wavelength of the LiNbO$_3$ amplifier versus grating angle. The solid line is that predicted by the grating formula:

$d(\sin \alpha + \sin \beta) = m\lambda$, where $\alpha$ and $\beta$ are the angles of the incident and diffracted beams defined with respect to the grating normal, respectively, d is the spacing of the grating rulings, and m is the grating order. In our experiment, $\beta - \alpha = 32.5°$ and m=1. The excellent agreement between theory and observation indicates that the grating alone is controlling the operating wavelength. The grating also controls the observed bandwidth. When the second crystal was placed 1.18 m from the grating and a pump-beam waist of 2 mm was used (approximately a 2 mm beam diameter), the signal and idler where both observed to have a bandwidth of 15 cm$^{-1}$ (FWHM). This agrees well with the 16 cm$^{-1}$ bandwidth calculated from the grating dispersion (6.67 cm$^{-1}$/mrad) multipled by the effective angle subtended by the pump in the crystal, again indicating that the grating is the dominant element. By moving the second crystal further from the grating, a pulse of 2 cm$^{-1}$ bandwidth (limited by the temporal characteristics of the pump pulse) could, in principle, be obtained. Based on gain calculations, we estimate that the 2 μm pulses have a duration of 10 to 15 ps.

The apparatus of the instant invention is extremely easy to align once temporal coincidence is achieved. Should the beam wander because of mechanical changes, another spectral-spatial component moves into alignment at a slightly shifted wavelength. Therefore, we have found the crystal and grating assembly to be highly stable and reliable. This is in marked contrast to picosecond optical parametric oscillators operated in the resonant cavity configuration.

Signal and idler beams are subsequently mixed in a CdSe crystal to generate tunable infrared pulses at the difference frequencies $|v_s - v_i|$. For a 1 cm long crystal with $\theta = 64.35°$, a band from 540 to 675 cm$^{-1}$ (FWHM) is phase-matched ($v_{ir} = v_s - v_i$). This allows a wide range of frequencies around 16 μm to be generated without the need for crystal rotation. Again, the tuning and bandwidth in the 14.8–18.5 μm region are controlled by the grating. Outside of this range it is necessary to rotate the CdSe crystal. We have observed 2 μJ of tunable radiation over the 14.8–18.5 μm region. This is somewhat less energy than expected. It is likely that the filters used to prevent the 1.064 μm beam from damaging the CdSe crystal also absorbed substantial energy from the signal and idler beams as well. Optimized filters can be purchased to improve this situation. Use of CdSe is convenient as a frequency mixer because of the fortuitous minimum in the down-conversion tuning curve near 16 μm which gives rise to the relatively large angular tolerance for phase-matching. This allows access to a wide range of frequencies without the need for crystal rotation.

In summary then, we have demonstrated successful operation of a broadly tunable picosecond infrared source that is continuously tunable and that permits the extension of the picosecond spectroscopy field over a wide region in the infrared. The bandwidth and operating wavelength are completely controlled by the use of a grating, and the device is simple, stable and reliable, the reliance on precise positioning of the nonlinear crystals having been overcome by operating near the degenerate point.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, a crystalline prism could be used instead of a diffraction grating to select a particular idler or signal frequency. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for producing narrow-bandwidth broadly and continuously tunable, picosecond duration, coherent infrared radiation, comprising:

(a) means for repetitively producing fixed wavelength, high energy picosecond duration coherent infrared light pulses;

(b) means for receiving and dividing said high energy pulses into two parts, and directing each portion along a different pathway, one part along path 1 and the other along path 2;

(c) means for generating and emitting picosecond, broad-banded, coherent signal and idler frequencies from amplification of spontaneous noise of the required frequencies, inserted in path 1 and responsive to and using as its source of energy said high energy light pulses;

(d) means for receiving and selecting a particular spectral component and a particular spatial component of coherent radiation selected from the group of said emitted coherent signal and idler frequencies;

(e) means for receiving, further amplifying and emitting selected spectral-spatial components of said coherent radiation selected from the group of said signal and idler frequencies and regenerating a corresponding idler and signal frequency, respectively, inserted in path 2 and responsive to and using as a source of energy said high energy light pulses; and (f) means for receiving and mixing said amplified selected spectral-spatial components of said coherent radiation selected from the group of said signal and idler frequencies and said regenerated corresponding idler and signal frequencies, respectively, producing and emitting difference frequencies of longer wavelength.

2. The apparatus of claim 1 wherein said means for producing and emitting said coherent signal and idler frequencies includes a three-photon traveling wave parametric oscillator situated in and oriented relative to said path 1 such that it is near its degeneracy point.

3. The apparatus of claim 2 wherein said receiving, further amplifying and regenerating means includes a three-photon traveling wave parametric amplifier situated in and oriented relative to said path 2 such that it is near its degeneracy point.

4. The apparatus of claim 3 wherein said means for selecting said spectral-spatial component of said coherent radiation selected from the group of said coherent signal and idler frequencies includes a diffraction grating.

5. The apparatus of claim 3 wherein said means for selecting said spectral-spatial component of coherent radiation selected from the group of said coherent signal and idler frequencies includes means for frequency selection followed by means for spatial selection.

6. The apparatus of claim 5 wherein said frequency selection means includes said diffraction grating and said spatial component selection means includes a simple aperture.

7. The apparatus of claim 4 or 6 wherein said source of said high energy picosecond light pulses includes a flashlamp-pumped mode-locked Nd:YAG laser where a single pulse is selected from the emitted pulse train by a crossed polarizer Pockels cell arrangement and is amplified in two about 0.635 cm diameter Nd:YAG amplifiers.

8. The apparatus of claim 7 wherein said three-proton traveling wave parametric oscillator includes a lithium niobate crystal hereafter to be labelled crystal 1.

9. The apparatus of claim 8 wherein said three-proton traveling wave parametric amplifier includes a lithium niobate crystal hereafter to be labelled crystal 2.

10. The apparatus of claim 9 wherein crystal 1 is about 4.5 cm long and cut at about $45 \pm 0.1°$.

11. The apparatus of claim 10 wherein crystal 2 is about 2 cm long and cut at about $45 \pm 0.1°$.

12. The apparatus of claim 11 wherein said diffraction grating is ruled to about 600 lines/mm.

13. The apparatus of claim 12 wherein said receiving and mixing means includes a crystal mixer hereafter to be labeled crystal 3.

14. The apparatus of claim 13 wherein said crystal 3 includes a cadmium selenide crystal.

15. The apparatus of claim 14 wherein said crystal 3 is about 1 cm long and cut at about $64.35°$.

16. A method for producing narrow-bandwidth broadly and continuously tunable, picosecond duration, coherent infrared radiation, comprising the steps of:

(a) repetitively producing fixed wavelengths, high energy picosecond duration infrared light pulses of a first frequency;

(b) receiving and dividing said high energy light pulses into two parts, and directing each portion along a different optical pathway;

(c) operating a three-proton traveling wave oscillator which is situated in one of said optical pathways and is responsive to said divided high energy light pulses at its degeneracy point, thereby generating and emitting picosecond duration, broad-banded, coherent signal and idler frequencies from amplifying spontaneous noise at the required frequencies using said divided high energy light pulses as a source of energy;

(d) receiving and selecting a particular narrow-banded spectral component of said emitted coherent signal and idler frequencies;

(e) receiving said particular narrow-banded spectral component and selecting a particular spatial component yielding a selected spectral-spatial component of coherent radiation selected from the group of said emitted coherent signal and idler frequencies;

(f) operating a three-photon traveling wave amplifier which is situated in the second of said optical pathways and responsive to both said divided high energy light pulses and said selected spectral-spatial component of coherent radiation selected from the group of said emitted coherent signal and idler frequencies, amplifying and emitting the latter and regenerating therefrom and emitting corresponding idler and signal frequencies, respectively, using said divided high energy light pulses as a source of energy; and (g) receiving and mixing said amplified selected spectral-spatial component of coherent radiation selected from the group of said emitted coherent signal and idler frequencies with said emitted corresponding idler and signal frequencies, respectively, producing and emitting coherent picosecond duration difference frequencies at a second frequency which is of longer wavelength, continuously tunable in the infrared region of the electromagnetic spectrum and of narrow bandwidth.

17. The method of claim 16, wherein said narrow bandwidth is less than 15 $cm^{-1}$ wide, full-width-at-half-maximum.

18. The method of claim 17, wherein said first frequency includes 1.06 $\mu m$ radiation and said second frequency is included in the wavelength range 10–20 $\mu m$.

* * * * *